(12) United States Patent
Kim et al.

(10) Patent No.: US 11,421,737 B2
(45) Date of Patent: Aug. 23, 2022

(54) BEARING DEVICE HAVING IMPROVED SEALING MOUNTING STRUCTURE

(71) Applicant: ILJIN GLOBAL CO., LTD, Seoul (KR)

(72) Inventors: Byung Taek Kim, Seoul (KR); In Jae Kim, Seoul (KR)

(73) Assignee: ILJIN GLOBAL CO., LTD, Seoul (KR)

(*) Notice: Subject to any disclaimer, the term of this patent is extended or adjusted under 35 U.S.C. 154(b) by 0 days.

(21) Appl. No.: 17/095,194

(22) Filed: Nov. 11, 2020

(65) Prior Publication Data

US 2021/0140484 A1 May 13, 2021

(30) Foreign Application Priority Data

Nov. 11, 2019 (KR) .................. 10-2019-0143780

(51) Int. Cl.
*F16C 33/78* (2006.01)
*B60B 27/00* (2006.01)
(Continued)

(52) U.S. Cl.
CPC ........ *F16C 33/7826* (2013.01); *B60B 27/001* (2013.01); *B60B 27/0073* (2013.01); *F16C 33/583* (2013.01); *F16C 33/7823* (2013.01); *F16C 33/7876* (2013.01); *F16C 43/045* (2013.01); *B60B 2380/14* (2013.01); *B60B 2380/73* (2013.01); *F16C 19/386* (2013.01);
(Continued)

(58) Field of Classification Search
CPC .. F16C 19/386; F16C 33/583; F16C 33/7813; F16C 33/7823; F16C 33/7826; F16C 33/7876; F16C 43/045; F16C 2326/02; B60B 27/001; B60B 27/0073; B60B 2380/14; B60B 2380/73
See application file for complete search history.

(56) References Cited

U.S. PATENT DOCUMENTS

| | | | |
|---|---|---|---|
| 2012/0170884 A1* | 7/2012 | Scott .................. | F16C 33/7823 384/486 |
| 2018/0274593 A1* | 9/2018 | Taniguchi ............. | F16C 33/583 |

FOREIGN PATENT DOCUMENTS

| | | | | |
|---|---|---|---|---|
| JP | 2004332898 A | * | 11/2004 | .......... F16C 33/7876 |
| JP | 2015102162 A | * | 6/2015 | .......... F16C 33/7876 |

OTHER PUBLICATIONS

Machine Translation of JP-2015102162-A (Year: 2015).*
Machine Translation of JP-2004332898-A (Year: 2004).*

* cited by examiner

*Primary Examiner* — Alan B Waits
(74) *Attorney, Agent, or Firm* — Dinsmore & Shohl LLP; Yongsok Choi, Esq.

(57) ABSTRACT

There is provided a bearing device in which an inner member and an outer member are connected to each other in a relative rotation relationship through rolling elements. A sealing member may be provided in an end portion of the bearing device so as to prevent an external foreign substance from flowing into the bearing device or prevent lubricant filled in the bearing device from leaking out of the bearing device. The sealing member may comprise a frame constituting a basic body and an elastic sealing portion attached to the frame, and the elastic sealing portion may comprise one or more sealing lips. The one or more sealing lips may comprise a main sealing lip configured to perform a main sealing function and an auxiliary sealing lip located inward of the main sealing lip.

6 Claims, 6 Drawing Sheets

(51) Int. Cl.
*F16C 43/04* (2006.01)
*F16C 33/58* (2006.01)
*F16C 19/38* (2006.01)

(52) U.S. Cl.
CPC ...... *F16C 33/7813* (2013.01); *F16C 2326/02* (2013.01)

BEARING DEVICE HAVING IMPROVED SEALING MOUNTING STRUCTURE

CROSS-REFERENCE TO RELATED APPLICATION

This application claims priority to Korean Patent Application No. 10-2019-0143780 filed on Nov. 11, 2019, the entire contents of which are herein incorporated by reference.

TECHNICAL FIELD

The present disclosure relates to a bearing device used to rotatably mount and support a rotary element relative to a non-rotary element in a rotary device, and more particularly, to a bearing device configured to prevent an internal pressure of the bearing device from excessively increasing when a sealing member is mounted to the bearing device using a sealing member mounting part having an improved structure.

BACKGROUND ART

A bearing is a device for rotatably mounting and supporting a rotary element relative to a non-rotary element in a rotary device, and is used by being mounted on various portions required for a rotational support, such as an axle of a vehicle.

For example, referring to FIG. 1, there is shown a wheel bearing 10 as an example of a bearing device for rotatably mounting and supporting a wheel of a vehicle on a vehicle body. As shown in FIG. 1, the wheel bearing 10 is configured such that a rotary element 20 on which the wheel of the vehicle is mounted, is connected to a non-rotary element 30 fixed to the vehicle body through rolling elements 40, and thus the wheel mounted on the rotary element 20 is rotatably supported to the vehicle body. A sealing member 50 is mounted to one end portion or both end portions of the wheel bearing 10 so as to prevent a foreign substance from flowing into the bearing or prevent lubricant (grease) inside the bearing from leaking out of the bearing.

On the other hand, the sealing member 50 mounted to the bearing device may be typically configured such that an elastic sealing portion 54 is attached to a frame 52 constituting a basic body, and sealing lips provided in the elastic sealing portion 54 are brought into contact with a counterpart member or disposed adjacent to the counterpart member to perform sealing.

For example, the elastic sealing portion 54 of the sealing member 50 may be configured to comprise one or more main sealing lips 56 and an auxiliary sealing lip (grease lip) 58 to perform the sealing. The one or more main sealing lips 56 may be brought into contact with the counterpart member or disposed adjacent to the counterpart member so as to perform a main sealing function. The auxiliary sealing lip 58 may be brought into contact with the counterpart member or disposed adjacent to the counterpart member at a position more adjacent to a bearing space in which the rolling elements are located, so that lubricant filled in the bearing space is prevented from leaking out of the bearing space.

The sealing member 50 having the above configuration may press the bearing space inside the bearing device when the sealing member 50 is mounted on the bearing device in a press-fitting manner, thus increasing the internal pressure of the bearing space. Such an increase in the internal pressure of the bearing space may be a cause of leaking the lubricant filled in the bearing space to the outside or degrading a sealing property of the sealing member.

For example, the sealing member 50 begins to be mounted to the bearing device in a state in which the inwardly-positioned auxiliary sealing lip 58 is in contact with the counterpart member (e.g., an outer peripheral surface of an inner ring 22 constituting the rotary element) from an initial stage as shown in the left view of FIG. 2. Thereafter, the sealing member 50 presses the internal bearing space of the bearing device while moving to a mounting position shown in the right view of FIG. 2. This may cause a problem that the internal pressure of the bearing space is excessively increased as the sealing member 50 is being mounted to the bearing device.

In particular, in the case of the sealing member 50 configured to perform the sealing by bringing the sealing lips (the main sealing lip 56 and the auxiliary sealing lip 58) of the sealing member 50 into direct contact with the counterpart member such as the inner ring with a predetermined level of interference in order to improve the sealing property as shown in FIGS. 1 and 2, such an increase in the internal pressure may be excessively generated. In addition, in a case of the sealing member 50 configured to fasten a garter spring 60 to the main sealing lip 56 so as to improve the adhesion of the main sealing lip 56, the problem of the above-described internal pressure increase may be more likely to generate when the sealing member 50 is mounted to the bearing device.

SUMMARY

Technical Problem

The present disclosure is to solve the above problems, and an object of the present disclosure is to provide a bearing device configured to suppress an increase in pressure of an internal bearing space of the bearing device as much as possible by making an inwardly-positioned auxiliary sealing lip come into contact with a sealing surface (mounting surface) at a relatively late time point when the sealing member is mounted to the bearing device using a stepped portion formed on the sealing surface (mounting surface) which is to be brought into contact with sealing lips of the sealing member.

Technical Solution

Representative configurations of the present disclosure for achieving the above-mentioned object are as follows.

According to one embodiment of the present disclosure, there is provided a bearing device in which an inner member and an outer member are connected to each other in a relative rotation relationship through rolling elements. According to one embodiment of the present disclosure, a sealing member may be provided in an end portion of the bearing device so as to prevent an external foreign substance from flowing into the bearing device or prevent lubricant filled in the bearing device from leaking out of the bearing device. According to one embodiment of the present disclosure, the sealing member may comprise a frame constituting a basic body and an elastic sealing portion attached to the frame, and the elastic sealing portion may comprise one or more sealing lips. According to one embodiment of the present disclosure, the one or more sealing lips may comprise a main sealing lip configured to perform a main sealing function and an auxiliary sealing lip located inward of the main sealing lip. According to one embodiment, the main sealing lip and the auxiliary sealing lip may be configured as contact-type sealing lips that are brought into contact with a sealing surface of a counterpart member to perform sealing.

According to one embodiment of the present disclosure, a first sealing surface that is in contact with the main sealing lip and a second sealing surface that is in contact with the auxiliary sealing lip may be formed to have different diameters.

According to one embodiment of the present disclosure, a contact portion of the main sealing lip which is in contact with the first sealing surface and a contact portion of the auxiliary sealing lip which is in contact with the second sealing surface may be formed to have different diameters.

According to one embodiment of the present disclosure, the sealing member may be mounted on the outer member of the bearing device in a press-fitting manner.

According to one embodiment of the present disclosure, the first sealing surface in contact with the main sealing lip and the second sealing surface in contact with the auxiliary sealing lip may be formed on an outer peripheral surface of the inner member.

According to one embodiment of the present disclosure, a diameter of the contact portion of the main sealing lip may be smaller than a diameter of the contact portion of the auxiliary sealing lip, and a diameter of the first sealing surface may be smaller than a diameter of the second sealing surface.

According to one embodiment of the present disclosure, the diameter of the contact portion of the main sealing lip may be smaller than the diameter of the first sealing surface, and the diameter of the contact portion of the auxiliary sealing lip may be larger than the diameter of the first sealing surface and may be smaller than the diameter of the second sealing surface.

According to one embodiment of the present disclosure, the main sealing lip may be formed to have a bent structure that extends radially inwardly and subsequently extends radially outwardly, wherein the main sealing lip may be configured to be in contact with the first sealing surface on an inner peripheral surface of a bent portion of the bent structure.

According to one embodiment of the present disclosure, a garter spring may be fastened to an outer peripheral surface of the bent portion of the main sealing lip.

According to one embodiment of the present disclosure, the first sealing surface in contact with the main sealing lip and the second sealing surface in contact with the auxiliary sealing lip may be connected to each other through an inclined surface.

According to one embodiment of the present disclosure, the first sealing surface and the second sealing surface may be configured such that when the sealing member is mounted on the bearing device, the auxiliary sealing lip is brought into contact with the second sealing surface after the contact of the main sealing lip.

According to one embodiment of the present disclosure, the first sealing surface, the second sealing surface and the inclined surface may be configured such that when the sealing member is mounted on the bearing device, the auxiliary sealing lip remains in a non-contact state before the contact of the main sealing lip.

According to one embodiment of the present disclosure, the bearing device may be configured as a wheel bearing for rotatably mounting and supporting a wheel of a vehicle relative to a vehicle body.

According to one embodiment of the present disclosure, the sealing member may be configured as a vehicle-body-side sealing member located in a vehicle-body-side end portion of the wheel bearing.

According to one embodiment of the present disclosure, the inner member may comprise a wheel hub to which the wheel is mounted and at least one inner ring mounted on the wheel hub in a press-fitting manner. The outer member may be configured as an outer ring coupled to a chassis component of the vehicle. The sealing member may be mounted in the press-fitting manner to the outer ring constituting the outer member. The first sealing surface in contact with the main sealing lip of the sealing member and the second sealing surface in contact with the auxiliary sealing lip of the sealing member may be formed on an outer peripheral surface of the inner ring.

Further, the bearing device according to the present disclosure may further comprise other additional configurations without departing from the technical sprit of the present disclosure.

Advantageous Effects

A bearing device (e.g., a wheel bearing) according to one embodiment of the present disclosure is configured such that a stepped structure having different diameters is formed on a sealing surface which is to be brought into contact with sealing lips of a sealing member, and a main sealing lip and an inwardly-positioned auxiliary sealing lip of the sealing member are brought into contact with the sealing surfaces having different diameters to perform sealing. Accordingly, it is possible to make the inwardly-positioned auxiliary sealing lip come into contact with a counterpart member at a relatively late time point when the sealing member is mounted to the bearing device, thus suppressing an increase in internal pressure of the bearing device as much as possible during the mounting of the sealing member to the bearing device. It is therefore possible to effectively preventing the leakage of lubricant or the degradation of performance/lifespan of the sealing member due to the increase in the internal pressure.

DETAILED DESCRIPTION

Figure 1:
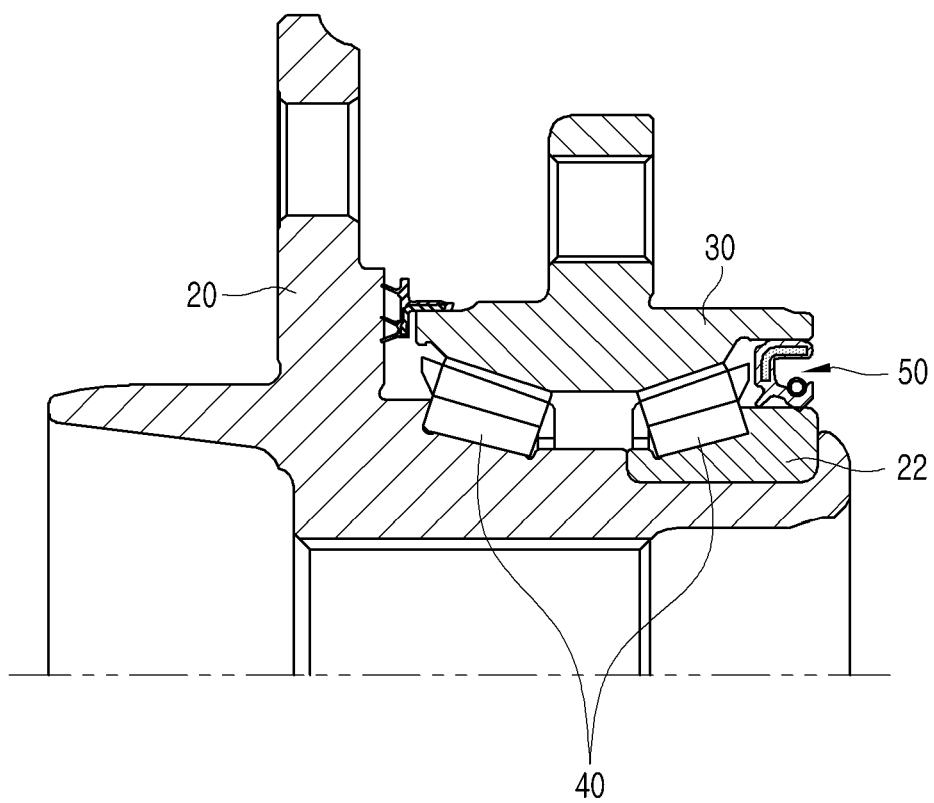
FIG. 1 exemplarily illustrates a conventional bearing device (wheel bearing).

Hereinafter, preferred embodiments of the present disclosure will be described in detail with reference to the appended drawings to such an extent that the present disclosure can be readily practiced by one of ordinary skill in the art.

Detailed descriptions of parts irrelevant to the present disclosure will be omitted for the purpose of more clearly describing the present disclosure. Throughout the specification, the same components will be described using same reference numerals. In addition, the shapes and sizes of the respective components shown in the drawings are arbitrarily shown for the sake of convenience in description, and hence the present disclosure is not necessarily limited to the shapes and sizes shown in the drawings. That is, it should be understood that specific shapes, structures, and characteristics described in the specification may be modified in various embodiments without departing from the spirit and scope of the present disclosure, and positions or arrangements of individual components may be modified without departing from the spirit and scope of the present disclosure. Therefore, detailed descriptions to be described below should be construed as non-limitative senses, and the scope of the present disclosure should be understood to include appended claims and their equivalents.

Bearing Device (Wheel Bearing) According to One Embodiment of the Present Disclosure Referring to FIGS. 3 to 6, a bearing device according to one embodiment of the present disclosure is exemplarily shown. The bearing device according to one embodiment of the present disclosure will be described below using a wheel bearing structure shown in FIGS. 3 to 6. However, the bearing device according to the present disclosure may not be formed by being limited to such a structure and may be modified into other various structures.

According to one embodiment of the present disclosure, similar to conventional bearing devices, a bearing device (wheel bearing) 100 may be configured such that an inner member 200 and an outer member 300 are connected to each other in a relative rotation relationship through rolling elements 400. In the embodiment shown in the figures, the bearing device 100 is configured such that the inner member 200 functions as a rotary element and the outer member 300 functions as a non-rotary element. However, the bearing device 100 according to one embodiment of the present disclosure may be modified into various aspects (e.g., the outer member may function as a rotary element and the inner member may function as a non-rotary element).

According to one embodiment of the present disclosure, the inner member 200 may be configured to include a wheel hub 210 to which a wheel is mounted, and an inner ring 220 mounted to wheel hub 210 in a press-fitting manner. The outer member 300 may be configured as an outer ring that is coupled to a chassis component of a vehicle and is fixed to a vehicle body.

According to one embodiment of the present disclosure, the wheel hub 210 constituting the inner member 200 may be formed in a generally cylindrical shape extending along an axial direction. A wheel mounting flange 230 may be provided near a wheel-side end portion of the wheel hub 210. In addition, a stepped portion 240 may be formed in a vehicle-body-side end portion of the wheel hub 210 so that the inner ring 220 is mounted on the stepped portion 240. A raceway (inner raceway) may be formed on a portion of an outer peripheral surface of the wheel hub 210 so as to support radially inwardly the rolling elements 400.

Figure 3:
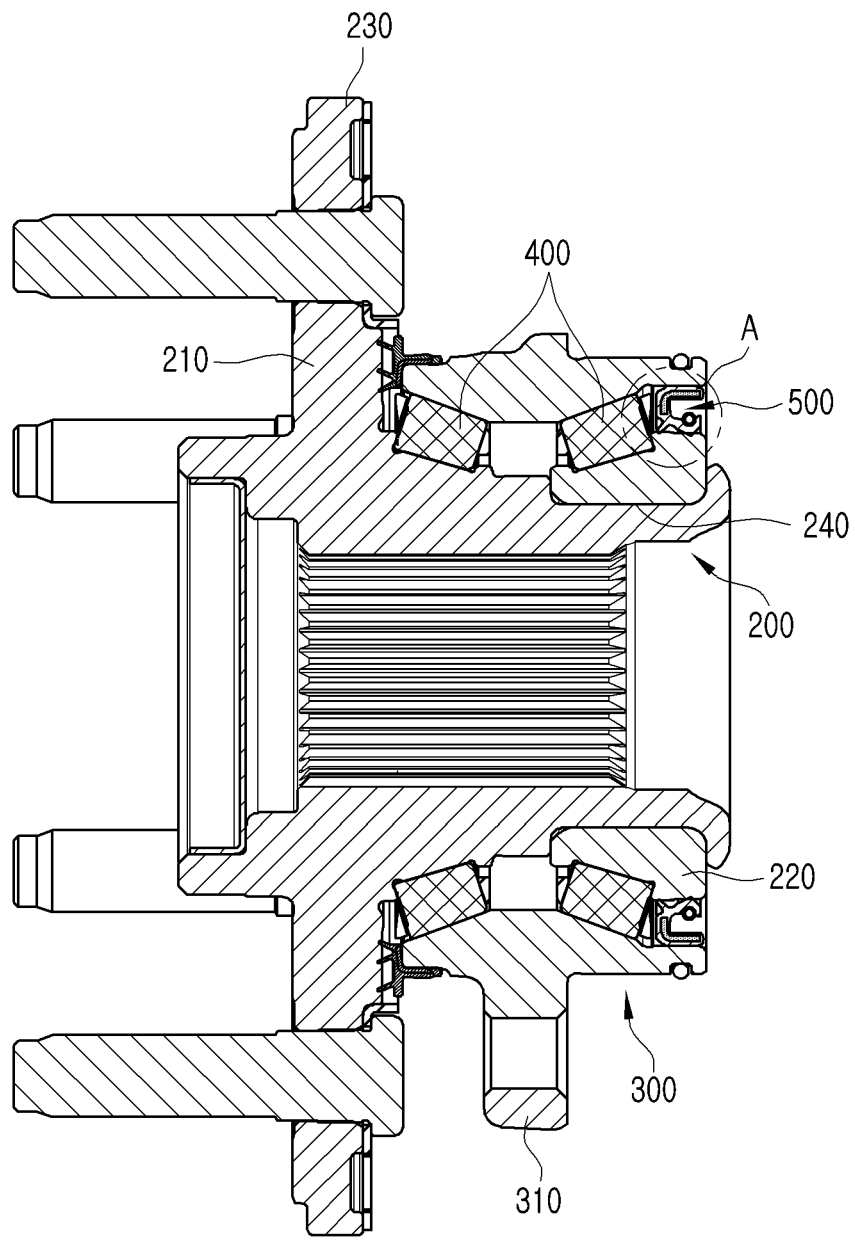
FIG. 3 exemplarily illustrates a structure of a bearing device (wheel bearing) according to one embodiment of the present disclosure.

According to one embodiment of the present disclosure, the inner ring 220 may be mounted to one side of the wheel hub 210 in a press-fitting manner. For example, the inner ring 220 may be mounted and held on the wheel hub 210 by plastically deforming the end portion of the wheel hub 210 as shown in FIG. 3 or fastening nuts or the like to the vehicle-body-side end portion of the wheel hub 210 in a state in which the inner ring 220 is press-fitted to the stepped portion 240 formed in the vehicle-body-side end portion of the wheel hub 210. Further, an outer peripheral surface of the inner ring 220 may be provided with a raceway (inner raceway) in contact with the rolling elements 400 so as to support radially inwardly the rolling elements 400.

In the embodiment shown in the figures, one inner raceway for supporting the rolling elements is directly formed on a portion of the outer peripheral surface of the wheel hub. In another embodiment, the bearing device may be configured such that two inner rings are mounted to the wheel hub and the raceways (inner raceways) for the rolling elements are formed by the two inner rings. Alternatively, the bearing device may be modified into any other structure (e.g., the inner ring may be mounted inside the wheel hub).

According to one embodiment of the present disclosure, the outer ring constituting the outer member 300 may comprise a vehicle-body-side mounting flange 310 for mounting the wheel bearing to the vehicle body on the outer peripheral surface thereof and may comprise raceways (outer raceways) in contact with the rolling elements 400 on an inner peripheral surface thereof. The raceways (outer raceways) formed on the inner peripheral surface of the outer ring may be configured to accommodate and support the rolling elements 400 as rolling bodies between the raceways in cooperation with the raceways (inner raceways) formed on the wheel hub 210 and/or the inner ring 220.

According to one embodiment of the present disclosure, the rolling elements 400 may be disposed between the inner member 200 and the outer member 300, and may perform a function of rotatably supporting a wheel mounted to the inner member 200 relative to the vehicle body to which the outer member 300 is coupled.

According to one embodiment of the present disclosure, a sealing member 500 may be provided in one end portion or both end portions of the bearing device (wheel bearing) 100 so as to prevent an external foreign substance from flowing into a bearing space in which the rolling elements are disposed or lubricant (grease) filled in the bearing space from leaking out of the bearing space.

Figure 4:
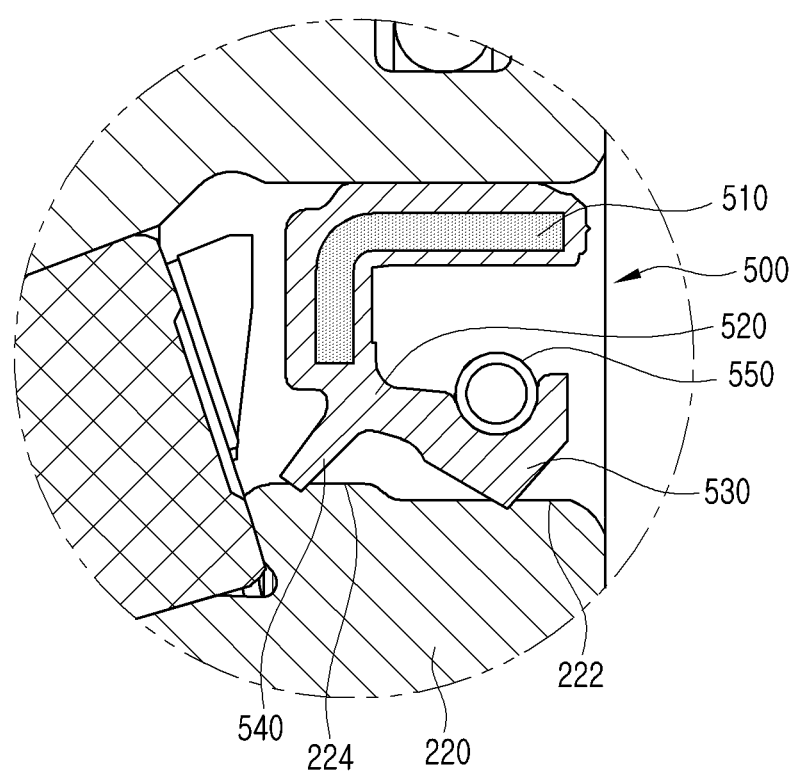
FIG. 4 exemplarily illustrates an enlarged view of a portion A shown in FIG. 3.

Referring to FIG. 4, there is exemplarily shown the sealing member mounted to one side of the bearing device (wheel bearing) 100 according to one embodiment of the present disclosure (in the embodiment shown in the figures, the sealing member is provided at the vehicle-body-side of the wheel bearing).

As shown in the figures, the sealing member 500 may be formed to have a structure similar to that of a conventional sealing member provided in a bearing device such as a wheel bearing. For example, the sealing member 500 may comprise a frame 510 constituting a basic body and an elastic sealing portion 520 attached to the frame 510, and may be configured to be mounted to one of the inner member and the outer member of the bearing device in a press-fitting manner (in the embodiment shown in the figures, the sealing member 500 is mounted to the outer ring constituting the outer member 300 in a press-fitting manner).

According to one embodiment of the present disclosure, the frame 510 may be a part forming the body for supporting the sealing member 500 and may be formed by bending a metallic plate or the like. For example, the frame 510 may be configured to comprise a cylindrical press-fitted portion that is mounted to the outer member 300 or the like of the bearing device in a press-fitting manner, and an extended portion extending radially from one side of the press-fitted portion.

According to one embodiment of the present disclosure, the elastic sealing portion 520 may be formed of an elastic material such as rubber and may be configured to cover all or a portion of the frame 510. According to one embodiment of the present disclosure, the elastic sealing portion 520 may be configured to be provided with one or more sealing lips extending from the frame 510 to perform sealing with respect to a counterpart member. For example, as shown in FIG. 4, the sealing member 500 may be configured to perform the sealing in a contact manner by arranging the sealing lips provided in the elastic sealing portion 520 to be brought into contact with the inner member 200, for example, the outer peripheral surface of the inner ring 220.

According to one embodiment of the present disclosure, the elastic sealing lips may be configured to comprise a main sealing lip 530 that performs a main sealing function with respect to the counterpart member (e.g., the inner ring), an auxiliary sealing lip (grease lip) 540 that are positioned inward of the main sealing lip 530 (at the side of the bearing space where the rolling elements are located) to prevent lubricant filled in the bearing space from leaking out of the bearing space, etc.

According to one embodiment of the present disclosure, the main sealing lip 530 may be formed to have a bent structure that extends radially inwardly from the frame 510 of the sealing member 500 and subsequently extends radially outwardly. The counterpart member may be brought into contact with an inner peripheral surface of the bent portion, thus performing sealing. That is, the inner peripheral surface of the bent portion may be configured as a contact portion with which the counterpart member comes into contact. On the other hand, a garter spring 550 may be fastened to an outer peripheral surface of the bent portion of the main sealing lip 530 to increase the adhesion of the main sealing lip 530. As a result, the sealing property by the main sealing lip 530 can be improved.

According to one embodiment of the present disclosure, the auxiliary sealing lip 540 of the sealing member 500 may be inwardly provided than the main sealing lip 530 (at the side of the bearing space in which the rolling elements are located). An end portion of the auxiliary sealing lip 540 becomes a contact portion in which the auxiliary sealing lip 540 is in contact with the counterpart member. Thus, it is possible to perform sealing with respect to the counterpart member in a contact manner.

For example, the main sealing lip 530 and the auxiliary sealing lip 540 of the sealing member 500 according to one embodiment of the present disclosure may be configured to perform sealing by bring into contact with the sealing surface of the counterpart member with a predetermined level of interference.

On the other hand, according to one embodiment of the present disclosure, the main sealing lip 530 and the auxiliary sealing lip 540 may be configured such that diameters of the contact portions in contact with the counterpart member are different from each other. As a result, the sealing member 500 according to one embodiment of the present disclosure can effectively suppress an increase in the internal pressure of the bearing space by delaying a time point of pressing the internal bearing space when the sealing member 500 is mounted to the bearing device, as will be described below.

According to one embodiment of the present disclosure, the sealing surface provided in the counterpart member (the inner ring 220 constituting the rotary element 20 in the embodiment shown in the figures) that interacts with the sealing member 500 may be formed to have a stepped structure, so that the main sealing lip 530 and the auxiliary sealing lip 540 of the sealing member 500 are brought into contact with sealing surfaces having different diameters to perform sealing.

Figure 5:
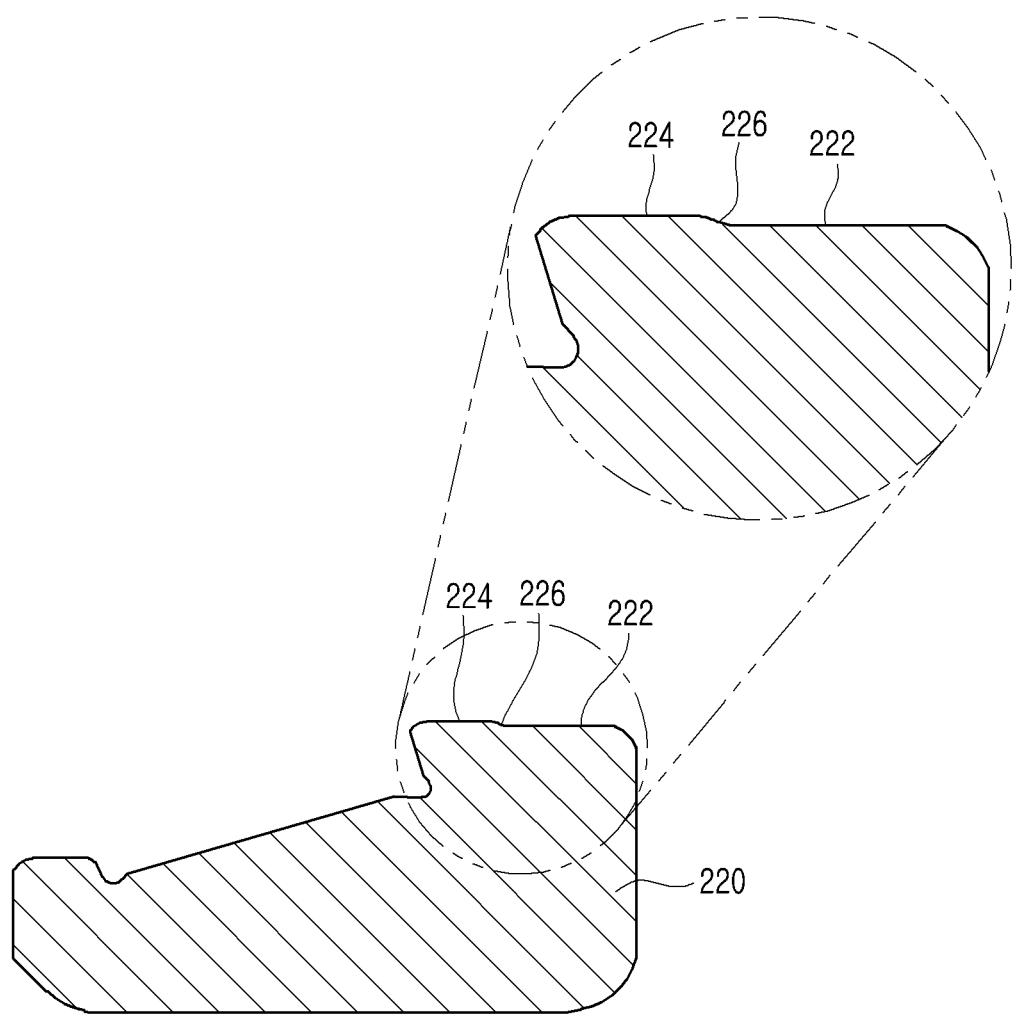
FIG. 5 exemplarily illustrates a structure of an inner member (inner ring) with which sealing lips of a sealing member are to be brought into contact in the bearing device (wheel bearing) shown in FIG. 3.

For example, in the embodiment shown in the figures, the outer peripheral surface of the inner ring 220, which makes contact with the sealing lips of the sealing member 500 to perform sealing, may be configured to comprise a first sealing surface 222 in contact with the main sealing lip 530 and a second sealing surface 224 in contact with the auxiliary sealing lip 540, wherein the first sealing surface 222 and the second sealing surface 224 are formed so as to have different diameters (as shown in FIGS. 4 and 5, the first sealing surface 222 in contact with the main sealing lip 530 is formed to have a diameter smaller than that of the second sealing surface 224 in contact with the auxiliary sealing lip 540).

According to one embodiment of the present disclosure, the diameter of the first sealing surface 222 may be larger than that of the contact portion of the main sealing lip 530 of the sealing member 500 (diameter of the inner peripheral surface of the bent portion), so that the main sealing lip 530 is brought into contact with the first sealing surface 222 with a predetermined level of interference, thus performing sealing. Further, the diameter of the first sealing surface 222 may be smaller than that of the contact portion of the auxiliary sealing lip 540 of the sealing member 500 (inner diameter of the end portion of the auxiliary sealing lip). Thus, when the sealing member 500 is mounted to the bearing device, the auxiliary sealing lip 540 may be positioned above the first sealing surface 222 in a non-contact state. This makes it is possible to prevent the internal bearing space of the bearing device from being pressed by the sealing member 500 at the initial mounting stage. On the other hand, the diameter of the second sealing surface 224 may be larger than that of the contact portion of the auxiliary sealing lip 540 of the sealing member 500, so that the auxiliary sealing lip 540 of the sealing member 500 is brought into contact with the second sealing surface 224 with a predetermined level of interference to perform the sealing.

According to one embodiment of the present disclosure, the first sealing surface 222 in contact with the main sealing lip 530 and the second sealing surface 224 in contact with the auxiliary sealing lip 540 may be configured to be connected to each other through an inclined surface 226 of a straight line or curve. By connecting the first sealing surface 222 and the second sealing surface 224 having different diameters through the inclined surface 226 in this manner, the auxiliary sealing lip 540 can be moved smoothly to the second sealing surface 224 via the inclined surface 226 when the sealing member 500 is mounted to the bearing device. Thus, the sealing member 500 can be easily mounted to the bearing device while preventing damage to the auxiliary sealing lip 540.

According to one embodiment of the present disclosure, the first sealing surface 222, the second sealing surface 224, and the inclined surface 226 provided therebetween may be formed to have a configuration in which when mounting the sealing member 500 to the bearing device, the contact of the auxiliary sealing lip 540 begins nearby to a time point of the contact of the main sealing lip 530 (for example, before and after a time point when the contact of the main sealing lip 530 begins).

Figure 6:
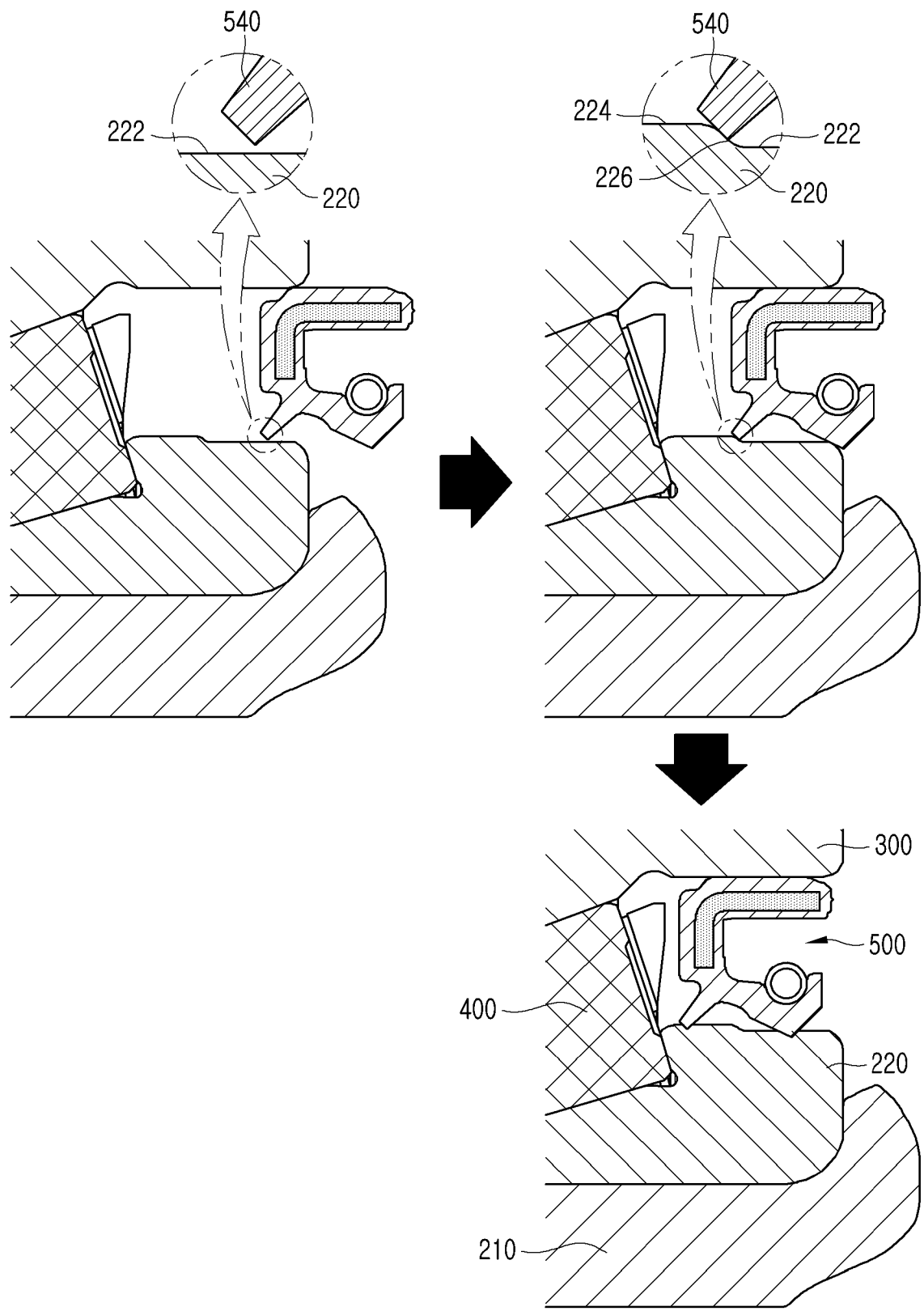
FIG. 6 exemplarily illustrates a state in which the sealing member is mounted to the bearing device (wheel bearing) shown in FIG. 3.

For example, the sealing member 500 according to one embodiment of the present disclosure may be configured such that: the inwardly-positioned auxiliary sealing lip 540 is mounted in a non-contact state at the initial mounting stage as shown in the upper-left view of FIG. 6; the auxiliary sealing lip 540 begins to contact with the inner ring (for example, begins to contact with the inclined surface 226 connecting the first sealing surface 222 and the second sealing surface 224) at a time point when the main sealing lip 530 is brought into contact with the inner ring as shown in the upper-right view of FIG. 6; and subsequently, the auxiliary sealing lip 540 is brought into contact with the second sealing surface 224 with a predetermined level of interference as the sealing member 500 is further inserted inward of the bearing device. That is, in the embodiment shown in the figures, the auxiliary sealing lip 540 may be configured to be brought into contact with the second sealing surface 224 after the contact of the main sealing lip 530 begins. Further, in order to prevent an increase in the internal pressure in a more stable manner, the auxiliary sealing lip 540 may be configured to be maintained in a non-contact state before the contact of the main sealing lip 530. However, the contact time of the auxiliary sealing lip 540 and the structures of the sealing lips and the sealing surfaces therefor may be modified within the appropriate range depending on design requirements of the bearing device by one skilled in the art.

According to the above-described configurations, in the bearing device (wheel bearing) 100 according to one embodiment of the present disclosure, when the sealing member 500 is mounted to the bearing device 100, the internal bearing space of the bearing device 100 begins to be pressed at a relatively late time point, which makes it is possible to suppress the increase in the internal pressure of the bearing space as much as possible. As a result, it is possible to effectively prevent the leakage of lubricant or the degradation of performance/lifespan of the bearing due to the increase in the internal pressure.

Figure 2:
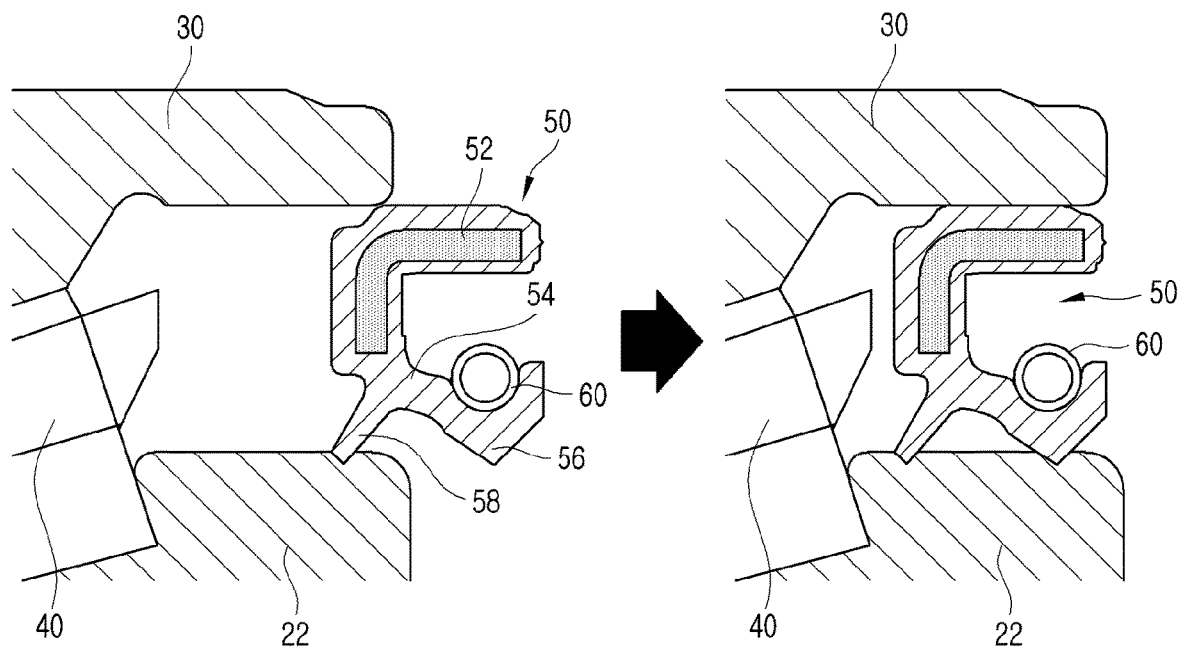
FIG. 2 exemplarily illustrates a state in which a sealing member is mounted on the bearing device (wheel bearing) shown in FIG. 1.

In the conventional bearing device, since the inwardly-positioned auxiliary sealing lip is in contact with the bearing device from an initial mounting stage, the sealing member is mounted to the bearing device while pressing the internal bearing space from an initial mounting stage (see FIG. 2). However, in the bearing device 100 according to one embodiment of the present disclosure, the sealing member 500 is mounted to the bearing device 100 while pressing the internal bearing space from a relatively late time point compared with the conventional bearing device. Thus, it is possible to effectively suppress the increase in the internal pressure of the bearing space when the sealing member 500 is mounted to the bearing device (see FIG. 6).

While the present disclosure has been described above by way of particular features such as specific components and the like, and exemplary some embodiments, these embodiments are provided to further facilitate overall understanding of the present disclosure, and the present disclosure is not limited thereto. Various modifications and variations may be made from the above descriptions by those skilled in the art.

Therefore, the spirit of the present disclosure should not be limited to the above-described embodiments, and not only the append claims but also all those modified equally or equivalently to the claims are intended to fall within the scope of the spirit of the present disclosure.

EXPLANATION OF REFERENCE NUMERALS

100: bearing device (wheel bearing)
200: inner member
210: wheel hub
220: inner ring
222: first sealing surface
224: second sealing surface
226: inclined surface
230: wheel mounting flange
240: stepped portion
300: outer member
310: vehicle-body-side mounting flange
400: rolling element
500: sealing member
510: frame
520: elastic sealing portion
530: main sealing lip
540: auxiliary sealing lip
550: garter spring

What is claimed is:

1. A bearing device in which an inner member and an outer member are connected to each other in a relative rotation relationship through rolling elements, comprising a sealing member provided in an end portion of the bearing device so as to prevent an external foreign substance from flowing into the bearing device or prevent an internal lubricant from leaking out of the bearing device, wherein the sealing member comprises a frame constituting a base body and an elastic sealing portion attached to the frame, the elastic sealing portion comprises one or more sealing lips, the one or more sealing lips comprises a main sealing lip configured to perform a main sealing function and an auxiliary sealing lip located inward of the main sealing lip, the main sealing lip and the auxiliary sealing lip are configured as contact-type sealing lips that are brought into contact with a sealing surface of a counterpart member to perform a sealing, and a first sealing surface that is in contact with the main sealing lip and a second sealing surface that is in contact with the auxiliary sealing lip are formed to have different diameters, wherein a contact portion of the main sealing lip which is in contact with the first sealing surface and a contact portion of the auxiliary sealing lip which is in contact with the second sealing surface are formed to have different diameters, wherein the sealing member is mounted to the outer member of the bearing device in a press-fitting manner, wherein the first sealing surface in contact with the main sealing lip and the second sealing surface in contact with the auxiliary sealing lip are formed on an outer peripheral surface of the inner member, wherein a diameter of the contact portion of the main sealing lip is smaller than a diameter of the contact portion of the auxiliary sealing lip, and a diameter of the first sealing surface is smaller than a diameter of the second sealing surface, wherein the diameter of the contact portion of the main sealing lip is smaller than the diameter of the first sealing surface, and the diameter of the contact portion of the auxiliary sealing lip is larger than the diameter of the first sealing surface and is smaller than the diameter of the second sealing surface, wherein the main sealing lip is formed to have a bent structure that extends radially inwardly and subsequently extends radially outwardly, and the main sealing lip is configured to be in contact with the first sealing surface on an inner peripheral surface of a bent portion of the bent structure, wherein a garter spring is fastened to an outer peripheral surface of the bent portion of the main sealing lip, and wherein the first sealing surface in contact with the main sealing lip and the second sealing surface in contact with the auxiliary sealing lip are connected to each other through an inclined surface.

2. The bearing device of claim 1, wherein the first sealing surface and the second sealing surface are configured such that when the sealing member is mounted to the bearing device, the auxiliary sealing lip is brought into contact with the second sealing surface after the main sealing lip is brought into contact with the first sealing surface.

3. The bearing device of claim 1, wherein the first sealing surface, the second sealing surface and the inclined surface are configured such that, when the sealing member is mounted to the bearing device, the auxiliary sealing lip remains in a non-contact state before the contact of the main sealing lip.

4. The bearing device of claim 1, wherein the bearing device is a wheel bearing for rotatably mounting and supporting a wheel of a vehicle relative to a vehicle body.

5. The bearing device of claim 4, wherein the sealing member is a vehicle-body-side sealing member located in a vehicle-body-side end portion of the wheel bearing.

6. The bearing device of claim 5, wherein the inner member comprises a wheel hub to which the wheel is mounted, and at least one inner ring mounted to the wheel hub in a press-fitting manner, the outer member is configured as an outer ring coupled to a chassis component of the vehicle, the sealing member is mounted in the press-fitting manner to the outer ring constituting the outer member, and the first sealing surface in contact with the main sealing lip of the sealing member and the second sealing surface in contact with the auxiliary sealing lip of the sealing member are formed on an outer peripheral surface of the inner ring.

* * * * *